US010511776B2

United States Patent
Zhu (10) Patent No.: US 10,511,776 B2
(45) Date of Patent: Dec. 17, 2019

(54) IMAGE FUSION METHOD AND APPARATUS, AND TERMINAL DEVICE

(71) Applicant: Huawei Technologies Co., Ltd., Shenzhen (CN)

(72) Inventor: Congchao Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/066,522

(22) PCT Filed: Dec. 28, 2015

(86) PCT No.: PCT/CN2015/099168
§ 371 (c)(1),
(2) Date: Jun. 27, 2018

(87) PCT Pub. No.: WO2017/113048
PCT Pub. Date: Jul. 6, 2017

(65) Prior Publication Data
US 2019/0014249 A1    Jan. 10, 2019

(51) Int. Cl.
*H04N 5/232* (2006.01)
*H04N 5/225* (2006.01)
*H04N 5/235* (2006.01)

(52) U.S. Cl.
CPC ......... *H04N 5/2327* (2013.01); *H04N 5/2258* (2013.01); *H04N 5/2355* (2013.01); *H04N 5/2356* (2013.01); *H04N 5/23254* (2013.01)

(58) Field of Classification Search
CPC ............ H04N 5/2258; H04N 5/23251; H04N 5/23254; H04N 5/2327; H04N 5/2355; H04N 5/2356
See application file for complete search history.

(56) References Cited

U.S. PATENT DOCUMENTS

| 7,619,656 B2 | 11/2009 | Ben-Ezra et al. |
| 10,165,194 B1 * | 12/2018 | Baldwin ............. H04N 5/2355 |
| 2005/0047672 A1 | 3/2005 | Ben-Ezra et al. |

(Continued)

FOREIGN PATENT DOCUMENTS

| CN | 101997981 A | 3/2011 |
| CN | 102104737 A | 6/2011 |

(Continued)

*Primary Examiner* — Daniel M Pasiewicz
(74) *Attorney, Agent, or Firm* — Slater Matsil, LLP (57) ABSTRACT

A method includes: capturing at least two frames of first images at a same exposure time using a first camera, and capturing at least two frames of second images at different exposure times using a second camera, where a capturing time of the first images and a capturing time of the second images are the same; determining a first reference image from the at least two frames of first images; performing moving target detection on an image other than the first reference image in the at least two frames of first images according to the first reference image to obtain a local motion magnitude that is of the image other than the first reference image in the at least two frames of first images and that is relative to the first reference image; and performing image fusion on the second images according to the local motion magnitude.

18 Claims, 5 Drawing Sheets

(56) References Cited

U.S. PATENT DOCUMENTS

| | | | |
|---|---|---|---|
| 2009/0174789 A1* | 7/2009 | Takeshita | H04N 5/145 348/222.1 |
| 2013/0083171 A1 | 4/2013 | Habuka et al. | |
| 2014/0232929 A1 | 8/2014 | Ichikawa | |
| 2015/0035998 A1* | 2/2015 | Mathew | H04N 5/2258 348/207.1 |
| 2015/0092066 A1* | 4/2015 | Geiss | H04N 5/2258 348/180 |
| 2015/0103200 A1 | 4/2015 | Vondran et al. | |
| 2015/0105123 A1* | 4/2015 | Song | H04M 1/0264 455/556.1 |
| 2015/0348242 A1 | 12/2015 | Molgaard et al. | |
| 2017/0126978 A1* | 5/2017 | Yun | H04N 5/2254 |

FOREIGN PATENT DOCUMENTS

| | | |
|---|---|---|
| CN | 102883099 A | 1/2013 |
| CN | 104349066 A | 2/2015 |
| JP | 2013081091 A | 5/2013 |
| JP | 2014160987 A | 9/2014 |

\* cited by examiner

IMAGE FUSION METHOD AND APPARATUS, AND TERMINAL DEVICE

CROSS-REFERENCE TO RELATED APPLICATIONS

This application is a national stage of International Application No. PCT/CN2015/099168, filed on Dec. 28, 2015, which application is hereby incorporated by reference in its entirety.

TECHNICAL FIELD

The present invention relates to the field of image processing technologies, and in particular, to an image fusion method and apparatus, and a terminal device.

BACKGROUND

A high dynamic range (HDR) image is obtained by fusing low dynamic range (LDR) images at different exposure times. The HDR image may provide more dynamic ranges and image details, and can better reflect a visual effect in a real-world environment. Because an HDR technology needs to capture LDR images at different exposure times, if a hand shake or an object in a scenario moves in a process of capturing the LDR images, ghosting occurs in an HDR image obtained by fusing the LDR images.

In a conventional image fusion method, at least two frames of images are continuously captured using a camera. Image registration and a de-ghosting algorithm are performed on the captured images to obtain processed images, so as to reduce effects brought by a hand shake or a moving scene on image fusion. An HDR image is obtained by fusing the processed images using an image fusion algorithm. Because there is an exposure difference when the at least two frames of images are continuously captured using a camera, moving target detection is inaccurate, and accuracy of the image fusion is relatively low.

SUMMARY

This application provides a data transmission method and apparatus, and a terminal device, so as to improve accuracy of moving target detection and eliminate ghosting, so that accuracy of image fusion is relatively high.

According to a first aspect, an image fusion method is provided, where the method is applied to a terminal device. A first camera and a second camera are provided on the terminal device. The method includes: capturing at least two frames of first images at a same exposure time by using the first camera, and capturing at least two frames of second images at different exposure times by using the second camera, where a capturing time of the first images and a capturing time of the second images are the same. The method also includes determining a first reference image from the at least two frames of first images. The method also includes performing moving target detection on an image other than the first reference image in the at least two frames of first images according to the first reference image to obtain a local motion magnitude that is of the image other than the first reference image in the at least two frames of first images and that is relative to the first reference image, where the local motion magnitude is used to indicate information about a quantity of pixels occupied by a moving target detected by the moving target detection. The method also includes performing image fusion on the second images according to the local motion magnitude.

In this technical solution, the terminal device may synchronously capture at least two frames of images using the first camera and the second camera, and exposure times of the at least two frames of first images captured by the first camera are the same. The terminal device performs moving target detection on the first images, so that accuracy of the moving target detection can be improved. Then, the terminal device performs, according to the first images captured by the first camera, image fusion on the second images captured by the second camera, so that ghosting can be eliminated, and accuracy of the image fusion is relatively high.

In a first possible implementation, the terminal device may determine whether the local motion magnitude is greater than or equal to a first preset threshold, and when the local motion magnitude is greater than or equal to the first preset threshold, output an image whose exposure time is a first preset time in the at least two frames of second images.

In this technical solution, when the local motion magnitude is greater than or equal to the first preset threshold, the terminal device may determine that a motion magnitude of the first reference image relative to the image other than the first reference image in the first images is relatively large. To avoid ghosting, the terminal device may directly output the second image whose exposure time is the first preset time.

With reference to the first aspect, in a second possible implementation, when the local motion magnitude is less than a second preset threshold, the terminal device may determine a second reference image from the at least two frames of second images, perform image registration on an image other than the second reference image in the at least two frames of second images according to the second reference image to obtain a registered second image, and perform image fusion on the second reference image and the registered second image by using an image fusion algorithm.

In this technical solution, when the local motion magnitude is less than the second preset threshold, the terminal device may determine that a motion magnitude of the first reference image relative to the image other than the first reference image in the first images is ignored. The terminal device may directly perform image fusion on the second reference image and the registered second image, and this does not affect accuracy of the image fusion.

With reference to the first aspect, in a third possible implementation, when the local motion magnitude is greater than or equal to a second preset threshold and is less than a first preset threshold, the terminal device may determine a second reference image from the at least two frames of second images, perform image registration on an image other than the second reference image in the at least two frames of second images according to the second reference image to obtain a registered second image, perform motion compensation on the registered second image according to the second reference image to obtain a motion-compensated second image, and perform image fusion on the second reference image and the motion-compensated second image using an image fusion algorithm.

In this technical solution, when the local motion magnitude is greater than or equal to the second preset threshold and is less than the first preset threshold, the terminal device may determine that a motion magnitude of the first reference image relative to the image other than the first reference image in the first images is relatively small. The terminal device may perform motion compensation on the registered second image according to the second reference image to obtain the motion-compensated second image, and perform image fusion on the second reference image and the motion-compensated second image using the image fusion algorithm, so that accuracy of the image fusion is improved.

With reference to any one of the first aspect, or the first to the third possible implementations of the first aspect, in a fourth possible implementation, the terminal device may perform moving target detection on the image other than the first reference image in the at least two frames of first images according to the first reference image to generate a motion compensation matrix that is of the image other than the first reference image in the at least two frames of first images and that is relative to the first reference image, perform image registration on the image other than the first reference image in the at least two frames of first images according to the motion compensation matrix to obtain a registered first image, and obtain a local motion magnitude that is of the registered first image and that is relative to the first reference image.

With reference to the fourth possible implementation of the first aspect, in a fifth possible implementation, after the performing moving target detection on the image other than the first reference image in the at least two frames of first images according to the first reference image to generate a motion compensation matrix that is of the image other than the first reference image in the at least two frames of first images and that is relative to the first reference image, in a process of performing image registration on an image other than the second reference image in the at least two frames of second images according to the second reference image, the terminal device may perform image registration on the image other than the second reference image in the at least two frames of second images according to the foregoing motion compensation matrix to obtain the registered second image.

It should be noted that, because the capturing time of the first images and the capturing time of second images are the same, a motion magnitude that is of the image other than the first reference image in the at least two frames of first images and that is relative to the first reference image is the same as a motion magnitude that is of the image other than the second reference image in the at least two frames of second images and that is relative to the second reference images. The terminal device may perform moving target detection on the image other than the first reference image in the at least two frames of first images according to the first reference image, use the generated motion compensation matrix that is of the image other than the first reference image in the at least two frames of first images and that is relative to the first reference image as the motion compensation matrix of the image other than the second reference image in the at least two frames of second images, and perform image registration on the image other than the second reference image in the at least two frames of second images according to the motion compensation matrix, so that image processing efficiency can be improved, and resource utilization is improved.

According to a second aspect, a computer storage medium is provided, where the computer storage medium may store a program, and when the program is executed, some or all steps of the first aspect are included.

According to a third aspect, an image fusion apparatus is provided, where the apparatus includes an image capturing unit, a reference image determining unit, a motion magnitude obtaining unit, and an image fusion unit, and the apparatus may be configured to implement some or all steps with reference to the first aspect.

According to a fourth aspect, a terminal device is provided, including a processor, a first camera, a second camera, and a memory. The memory stores a set of program code. The processor, the first camera, and the second camera call the program code stored in the memory to perform the following operations. The first camera captures at least two frames of first images at a same exposure time. The second camera captures at least two frames of second images at different exposure times, where a capturing time of the first images and a capturing time of the second images are the same. The processor determines a first reference image from the at least two frames of first images. The processor performs moving target detection on an image other than the first reference image in the at least two frames of first images according to the first reference image to obtain a local motion magnitude that is of the image other than the first reference image in the at least two frames of first images and that is relative to the first reference image. The processor performs image fusion on the second images according to the local motion magnitude, where the local motion magnitude is used to indicate information about a quantity of pixels occupied by a moving target detected by the moving target detection.

In a first possible implementation, that the processor performs image fusion on the second images according to the local motion magnitude specifically includes: when the local motion magnitude is greater than or equal to a first preset threshold, outputting, by the processor, an image whose exposure time is a first preset time in the at least two frames of second images.

With reference to the fourth aspect, in a second possible implementation, that the processor performs image fusion on the second images according to the local motion magnitude specifically includes: when the local motion magnitude is less than a second preset threshold, determining, by the processor, a second reference image from the at least two frames of second images; performing, by the processor, image registration on an image other than the second reference image in the at least two frames of second images according to the second reference image to obtain a registered second image; and performing, by the processor, image fusion on the second reference image and the registered second image by using an image fusion algorithm.

With reference to the fourth aspect, in a third possible implementation, that the processor performs image fusion on the second images according to the local motion magnitude specifically includes: when the local motion magnitude is greater than or equal to a second preset threshold and is less than a first preset threshold, determining, by the processor, a second reference image from the at least two frames of second images; performing, by the processor, image registration on an image other than the second reference image in the at least two frames of second images according to the second reference image to obtain a registered second image; performing, by the processor, motion compensation on the registered second image according to the second reference image to obtain a motion-compensated second image; and performing, by the processor, image fusion on the second reference image and the motion-compensated second image by using an image fusion algorithm.

With reference to any one of the fourth aspect, or the first to the third possible implementations of the fourth aspect, in a fourth possible implementation, that the processor performs moving target detection on an image other than the first reference image in the at least two frames of first images according to the first reference image to obtain a local motion magnitude that is of the image other than the first reference image in the at least two frames of first images and that is relative to the first reference image specifically includes: performing, by the processor, moving target detection on the image other than the first reference image in the at least two frames of first images according to the first reference image to generate a motion compensation matrix that is of the image other than the first reference image in the at least two frames of first images and that is relative to the first reference image; performing, by the processor, image registration on the image other than the first reference image in the at least two frames of first images according to the motion compensation matrix to obtain a registered first image; and obtaining, by the processor, a local motion magnitude that is of the registered first image and that is relative to the first reference image.

With reference to the fourth possible implementation of the fourth aspect, in a fifth possible implementation, that the processor performs image registration on an image other than the second reference image in the at least two frames of second images according to the second reference image to obtain a registered second image specifically includes: performing, by the processor, image registration on the image other than the second reference image in the at least two frames of second images according to the motion compensation matrix to obtain the registered second image.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention.

Figure 1A:
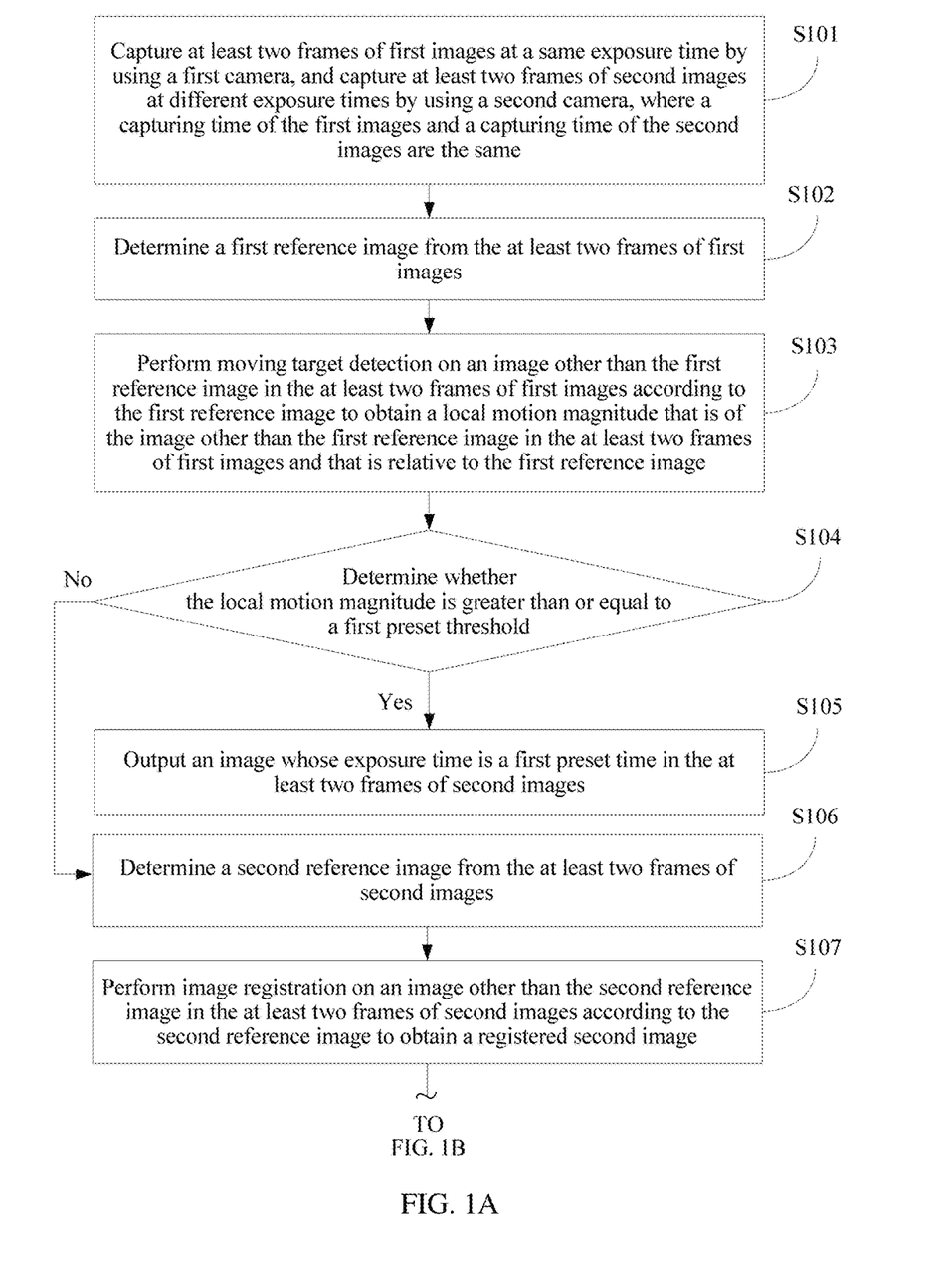
FIG. 1A and FIG. 1B are a schematic flowchart of an image fusion method according to an embodiment of the present invention.
Figure 1B:
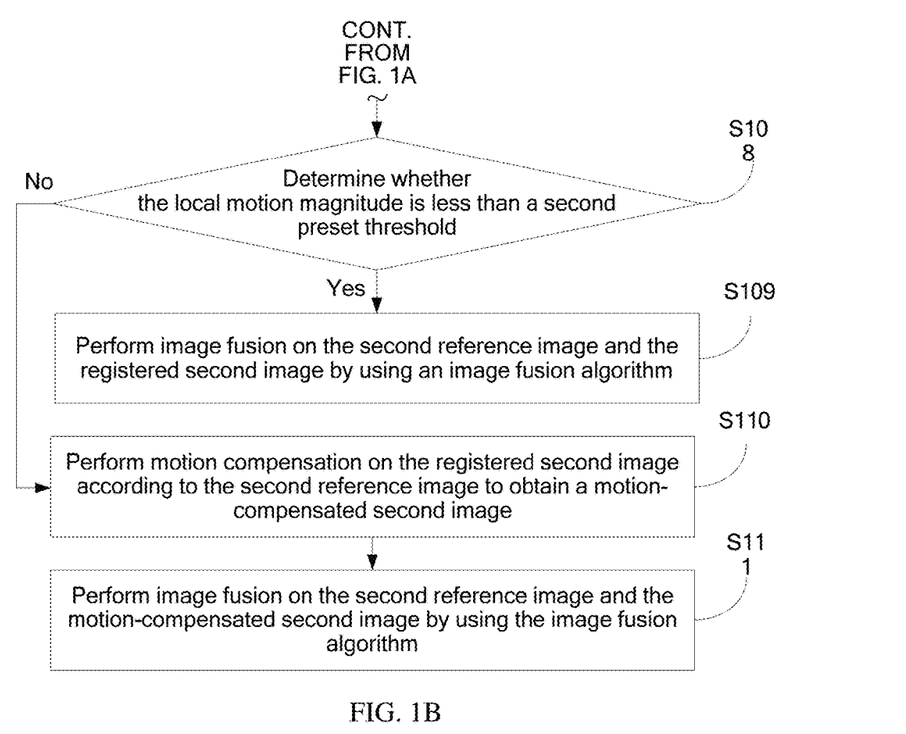

FIG. 1A and FIG. 1B are a schematic flowchart of an image fusion method according to an embodiment of the present invention. The image fusion method shown in the figures in this embodiment of the present invention may include at least the following steps.

S101. Capture at least two frames of first images at a same exposure time using a first camera, and capture at least two frames of second images at different exposure times using a second camera, where a capturing time of the first images and a capturing time of the second images are the same.

Figure 2A:
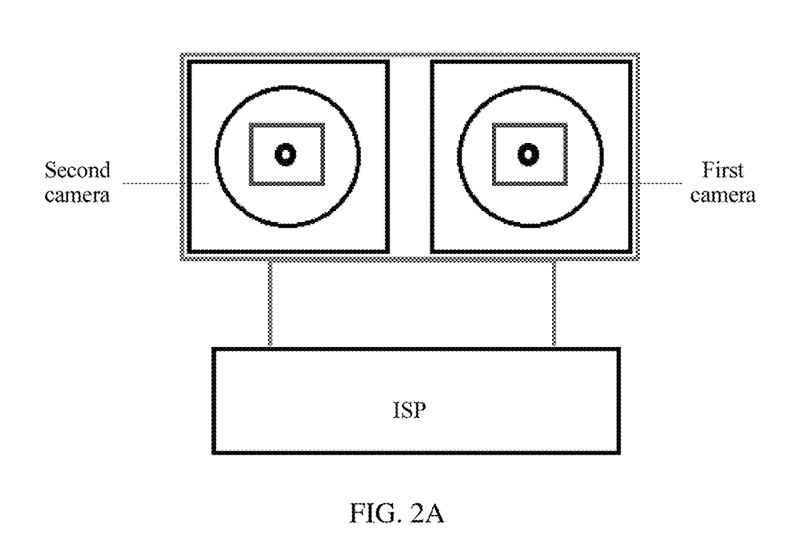
FIG. 2A is a schematic structural diagram of a camera according to an embodiment of the present invention.

A first camera and a second camera are provided on the terminal device. A schematic structural diagram of a camera shown in FIG. 2A is used as an example. The first camera and the second camera are independent from each other, and the first camera and the second camera may be integrated into a same side of the terminal device, so that the two cameras can have a same view range as much as possible. The terminal device can control, using an image signal processor (ISP), the first camera and second camera to synchronously capture at least two frames of images. Therefore, a capturing time at which the first camera captures the first images and a capturing time at which the second camera captures the second images are the same. For example, the terminal device may be a dual-camera smart phone. Two cameras in the dual-camera smart phone may shoot a same picture. When first images captured by a first camera include a first frame of first images and a second frame of first images, and second images captured by a second camera include a second frame of first images and a second frame of second images, a capturing time of the first frame of first images and that of the first frame of second images are the same, and a capturing time of the second frame of first images and that of the second frame of second images are the same. In addition, the first frame of first images and the first frame of second images include a same picture, and the second frame of first images and second frame of second images include a same picture. Therefore, a local motion magnitude of the first frame of first images relative to the second frame of first images and a local motion magnitude of the first frame of second images relative to the second frame of second images are the same.

Exposure times of the first images captured by the first camera are the same, and exposure times of the second images captured by the second camera are different. For example, the first camera captures a first frame of first images and a second frame of first images whose exposure time is a first preset time, and the second camera captures a first frame of second images whose exposure time is the first preset time and a second frame of second images whose exposure time is a second preset time. A capturing time of the first frame of first images and a capturing time of the first frame of second images are the same, and a capturing time of the second frame of first images and a capturing time of the second frame of second images are the same. The first preset time may be a normal exposure time obtained by means of calculation by an automatic exposure (AE) apparatus in a current shooting environment. For example, when an aperture is F8, a shutter speed is $1/125$ seconds, and therefore the first preset time is $1/125$ seconds; or when an aperture is F5.6, a shutter speed is $1/250$ seconds, and therefore the first preset time is $1/250$ seconds. The second preset time may be greater than or less than the first preset time, for example, $1/120$ seconds or $1/200$ seconds.

The first images may be grayscale images or color images, and the second images may be grayscale images or color images. This is not specifically limited in this embodiment of the present invention.

Figure 2B:
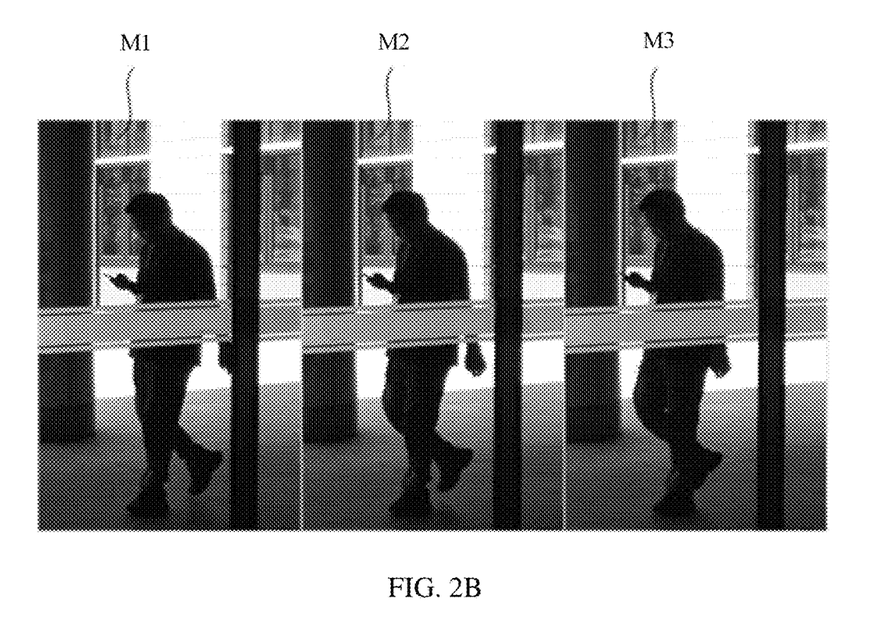
FIG. 2B is a schematic diagram of an interface with a first image according to an embodiment of the present invention.
Figure 2C:
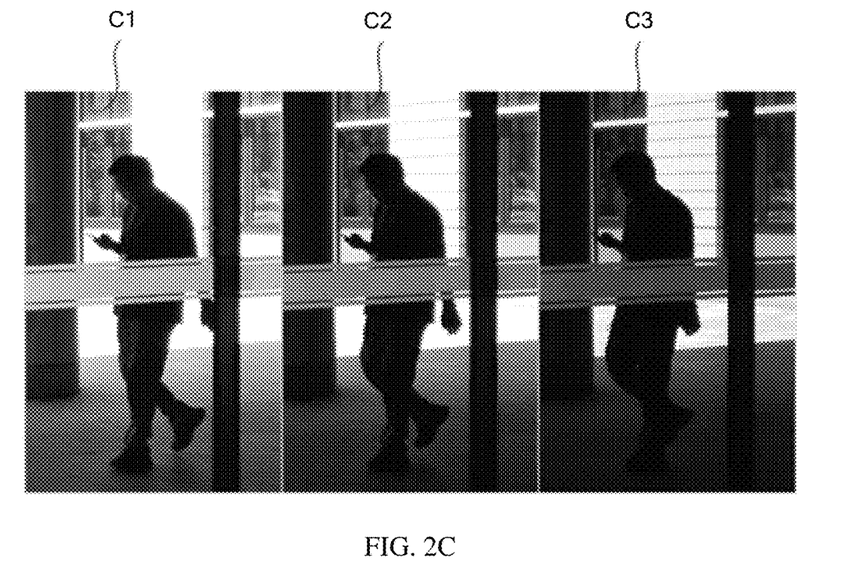
FIG. 2C is a schematic diagram of an interface with a second image according to an embodiment of the present invention.

A schematic diagram of an interface with a first image shown in FIG. 2B is used as an example. The terminal device may capture three frames of first images using the first camera. M1 is a first frame of first images, M2 is a second frame of first images, and M3 is a third frame of first images. A schematic diagram of an interface with a second image shown in FIG. 2C is used as an example. The terminal device may synchronously capture three frames of second images using the second camera. C1 is a first frame of second images, C2 is a second frame of second images, and C3 is a third frame of second images. Exposure times of M1, M2, and M3 are the first preset time, and exposure times of C1, C2, and C3 may not be totally the same. For example, an exposure time of C1 is the second preset time, an exposure time of C2 is the first preset time, and an exposure time of C3 is a third preset time. The first preset time and the second preset time are different, the first preset time and the third preset time are different, but the second preset time and the third preset time may be the same. Optionally, the second preset time and the third preset time may also be different. A capturing time of M1 and a capturing time of C1 are the same, and M1 and C1 include a same picture. A capturing time of M2 and a capturing time of C2 are the same, and M2 and C2 include a same picture. A capturing time of M3 and a capturing time of C3 are the same, and M3 and C3 include a same picture.

S102. Determine a first reference image from the at least two frames of first images.

The terminal device may determine the first reference image from the at least two frames of first images. In specific implementation, the terminal device may determine a first image whose capturing time is the same as that of a second image whose exposure time is the first preset time as the first reference image. For example, the second image whose exposure time is the first preset time is C1, the first image whose capturing time is the same as that of C1 is M1, and the terminal device may use M1 as the first reference image.

S103. Perform moving target detection on an image other than the first reference image in the at least two frames of first images according to the first reference image to obtain a local motion magnitude that is of the image other than the first reference image in the at least two frames of first images and that is relative to the first reference image.

The terminal device may perform moving target detection on the image other than the first reference image in the at least two frames of first images according to the first reference image to obtain the local motion magnitude that is of the image other than the first reference image in the at least two frames of first images and that is relative to the first reference image.

For example, the terminal device may perform moving target detection separately on M1 and M3 according to M2, to obtain a local motion magnitude of M1 relative to M2 and a local motion magnitude of M3 relative to M2. Specifically, the terminal device may perform moving target detection on M1 according to M2 to generate a motion compensation matrix H1 of M1 relative to M2, and perform image registration on M1 according to H1 to generate a registered first image M1', to obtain a local motion magnitude T1 of M1' relative to M2. The terminal device may further perform moving target detection on M3 according to M2 to generate a motion compensation matrix H2 of M3 relative to M2, and perform image registration on M3 according to H2 to generate a registered first image M3', to obtain a local motion magnitude T2 of M3' relative to M2. The terminal device may obtain a minimum local motion magnitude from T1 and T2, and use the minimum local motion magnitude as the local motion magnitude that is of the image other than the first reference image in the at least two frames of first images and that is relative to the first reference image.

The moving target detection method may include an inter-frame difference method, an optical flow method, a background-difference method, or the like. The inter-frame difference method is for obtaining a moving target profile by performing a difference operation on two neighboring frames of images. When there is abnormal object motion in a shooting scenario, there is a relatively obvious difference between frames. A motion feature of an image sequence is analyzed by determining whether a difference value of the two neighboring frames of images is greater than a threshold, to determine whether there is an object motion in the image sequence. An optical flow is a simple and practical expression manner of image motion, and is defined as apparent motion of an image brightness mode in the image sequence. That is, a motion speed of a point on a space object surface is expressed on an imaging plane of a visual sensor. A pixel of a moving target in the picture is detected by using a vector difference between a pixel occupied by the moving target in an image and a background pixel. The background difference method is a method for detecting a motion object by comparing a current frame with a background reference model in the image sequence. For example, that the terminal device performs moving target detection on M1 according to M2 to generate a motion compensation matrix H1 of M1 relative to M2 may be specifically as follows. Feature points of M1 and M2 are respectively extracted by using a feature extraction algorithm, matching is performed on the feature points of M1 and M2, and a coordinate transformation parameter, that is H1, between M1 and M2 is fitted using the least square method based on multiple pairs of feature points that are successfully matched. The feature extraction algorithm may include a scale-invariant feature transform (SIFT), speeded up robust features (SURF), or the like. The motion compensation matrix may be used to represent a motion relationship between two frames of images, for example, a translation or a rotation of M2 relative to M1.

The image registration refers to a process of matching and overlapping at least two frames of images that are obtained at different times, by different sensors (imaging devices), or in different conditions (a climate, an illumination, a shooting location or angle, or the like). An image registration method may include a grayscale-based method, a transform-domain based method, a feature-based method, or the like. In a grayscale-based image registration method, a similarity between images is measured according to grayscale statistics of the images. The grayscale-based image registration method may include a sequential similarity detection algorithm (SSDA). If in a process of calculating a residual sum of two frames of images at a pixel, the residual sum is greater than a fixed threshold, it is considered that the current pixel is not a matching pixel. Therefore, current calculation of the residual sum is terminated, another pixel is selected for calculating a residual sum, and finally it is considered that a pixel at which a residual sum increases most slowly is the matching pixel. The transform-domain based image registration method may include a Fourier Transform method. A phase-related technology is based on a translation nature of the Fourier Transform. A difference between two frames of images lies in a displacement, and therefore a phase difference between the two frames of images is equal to a phase of a cross power spectrum, and inverse Fourier transformation is performed on the phase difference to obtain a pulse function. The pulse function is not zero at a translation location, and is zero at other locations. A location that is not zero is a registered location to be determined. The feature-based image registration method is used to pre-process to-be-registered images, that is, a process of image segmentation and feature extraction, to match features between the two frames of images, so as to establish a registration mapping relationship between the images using a feature matching relationship. For example, that the terminal device performs image registration on M1 according to H1 to generate a registered first image M1' may be specifically: Coordinate transformation is performed on M1 according to H1 to obtain M1'.

The local motion magnitude is used to indicate information about a quantity of pixels occupied by a moving target detected by the moving target detection, and the information about a quantity of pixels occupied by the moving target may include a quantity of pixels occupied by the moving target or a ratio of the quantity of pixels occupied by the moving target to a total quantity of pixels of an image. That the terminal device obtains a local motion magnitude T1 of M1' relative to M2 may be specifically: Each pixel in M1' is subtracted from a corresponding pixel in M2, and when an absolute value of a value obtained using subtraction is greater than a preset value, the terminal device may determine that the pixel is a pixel occupied by the moving target.

S104. Determine whether the local motion magnitude is greater than or equal to a first preset threshold.

The terminal device may determine whether the local motion magnitude is greater than or equal to the first preset threshold. When the local motion magnitude is greater than or equal to the first preset threshold, the terminal device may further perform step S105; or when the local motion magnitude is less than the first preset threshold, the terminal device may further perform step S106.

S105. When the local motion magnitude is greater than or equal to the first preset threshold, output an image whose exposure time is a first preset time in the at least two frames of second images.

When the local motion magnitude is greater than or equal to the first preset threshold, the terminal device may output the image whose exposure time is the first preset time in the at least two frames of second images. For example, the image whose exposure time is the first preset time in the second images captured by the terminal device using the second camera is C2. When the local motion magnitude is greater than or equal to the first preset threshold, if the smallest local motion magnitude is T1, the terminal device may determine that a motion magnitude of M1' relative to M2 is relatively large. To avoid ghosting, the terminal device may output C2. Optionally, when the local motion magnitude is greater than or equal to the first preset threshold, if the smallest local motion magnitude is T2, the terminal device may determine that a motion magnitude of M3' relative to M2 is relatively large. To avoid ghosting, the terminal device may output C2.

S106. When the local motion magnitude is less than the first preset threshold, determine a second reference image from the at least two frames of second images.

When the local motion magnitude is less than the first preset threshold, the terminal device may determine the second reference image from the at least two frames of second images. In specific implementation, the terminal device may determine a second image whose exposure time is the first preset time as the second reference image. For example, if second images captured by the terminal device using the second camera include a first frame of second images C1, a second frame of second images C2, and a third frame of second images C3, and an exposure time of C2 is the first preset time, the terminal device may use C2 as the second reference image.

S107. Perform image registration on an image other than the second reference image in the at least two frames of second images according to the second reference image to obtain a registered second image.

The terminal device may perform image registration on the image other than the second reference image in the at least two frames of second images according to the second reference image to obtain the registered second image. For example, the terminal device may perform image registration on C1 according to C2 to obtain a registered second image C1', and the terminal device may further perform image registration on C3 according to C2 to obtain a registered second image C3'. Specifically, the terminal device may perform image registration on C1 according to H1, that is, perform coordinate transformation on C1 according to H1 to obtain C1'. The terminal device may further perform image registration on C3 according to H2, that is, perform coordinate transformation on C3 according to H2 to obtain C3'.

S108. Determine whether the local motion magnitude is less than a second preset threshold.

After obtaining the registered second image, the terminal device may further determine whether the local motion magnitude is less than the second preset threshold. When the local motion magnitude is less than the second preset threshold, step S109 is further performed; or when the local motion magnitude is greater than or equal to the second preset threshold, step S110 is further performed. For example, if the minimum local motion magnitude is T1, the terminal device may determine whether T1 is less than the second preset threshold; or if the minimum local motion magnitude is T2, the terminal device may determine whether T2 is less than the second preset threshold. The second preset threshold is less than the first preset threshold, and the first preset threshold and the second preset threshold are preset motion magnitude thresholds. The preset motion magnitude thresholds may be set by a user or may be configured in the terminal device before factory delivery.

S109. When the local motion magnitude is less than the second preset threshold, perform image fusion on the second reference image and the registered second image using an image fusion algorithm.

When the local motion magnitude is less than the second preset threshold, the terminal device may perform image fusion on the second reference image and the registered second image using the image fusion algorithm. The image fusion algorithm is as follows. Image processing is performed on images that are of a same target and that are captured through multi-source channels, useful information in each channel is extracted to the maximum, and finally a high-quality image is obtained using fusion. The image fusion algorithm may include a logic filtering method, a grayscale weighted averaging method, a wavelet transformation method, a Bayesian method, or the like. For example, if the minimum local motion magnitude is T1, when the local motion magnitude is less than the second preset threshold, the terminal device may determine that a motion magnitude of M1' relative to M2 may be ignored, then perform image fusion on C2, C1', and C3' using the image fusion algorithm, and output a fused image. Optionally, if the minimum local motion magnitude is T2, when the local motion magnitude is less than the second preset threshold, the terminal device may determine that a motion magnitude of M3' relative to M2 is zero, then perform image fusion on C2, C1', and C3' using the image fusion algorithm, and output a fused image.

S110. When the local motion magnitude is greater than or equal to the second preset threshold, perform motion compensation on the registered second image according to the second reference image to obtain a motion-compensated second image.

When the local motion magnitude is greater than or equal to the second preset threshold, the terminal device may perform motion compensation on the registered second image according to the second reference image to obtain a motion-compensated second image. For example, if the minimum local motion magnitude is T1, when the local motion magnitude is greater than or equal to the second preset threshold, the terminal device may determine that a motion magnitude of M1' relative to M2 is relatively small, then perform motion compensation on C1' according to C2 to obtain a motion-compensated second image C1", and perform motion compensation on C3' according to C2 to obtain a motion-compensated second image C3'. Optionally, if the minimum local motion magnitude is T2, when the local motion magnitude is less than the second preset threshold, the terminal device may determine that a motion magnitude of M3' relative to M2 is zero, and perform motion compensation on C1' according to C2 to obtain a motion-compensated second image C1", and perform motion compensation on C3' according to C2 to obtain a motion-compensated second image C3".

The motion compensation is a method for describing a difference between two neighboring frames of images. That is, a current image is predicted and compensated according to a reference image. Motion compensation methods may include global motion compensation and block motion compensation. That the terminal device performs motion compensation on C1' according to C2 to obtain a motion-compensated second image C1" may be specifically as follows. The terminal device performs moving target detection on C1' according to C2, and performs compensation on a local motion region obtained by detection, that is, a pixel in C1' is subtracted from a corresponding pixel in C2. When an absolute value of a value obtained by means of subtraction is greater than a preset value, the terminal device may determine that the pixel is in motion, and use all pixels in motion in C1' as the local motion region. The terminal device may adjust the local motion region in C1' to corresponding pixels in C2, so as to implement motion compensation on C1'. Optionally, the terminal device may adjust brightness of the local motion region in C1' to brightness of the corresponding pixels in C2, so as to implement motion compensation on C1'.

S111. Perform image fusion on the second reference image and the motion-compensated second image by using the image fusion algorithm.

The terminal device may perform image fusion on the second reference image and the motion-compensated second image using the image fusion algorithm. For example, the terminal device may perform image fusion on C2, C1", and C3" using the image fusion algorithm, and output a fused image.

When the second image is a grayscale image, the terminal device performs image fusion on the second image according to the first image, and an image output by the terminal device is a fused second image, that is, a grayscale image; or when the second image is a color image, the terminal device performs image fusion on the second image according to the first image, and an image output by the terminal device is a fused second image, that is, a color image.

In the image fusion method shown in FIG. 1A and FIG. 1B, the at least two frames of first images at the same exposure time are captured using the first camera, the at least two frames of second images at the different exposure times are captured using the second camera, and the capturing time of the first images and the capturing time of the second images are the same. The first reference image is determined from the at least two frames of first images, the moving target detection is performed on the image other than the first reference image in the at least two frames of first images according to the first reference image to obtain the local motion magnitude that is of the image other than the first reference image in the at least two frames of first images and that is relative to the first reference image, and the image fusion is performed on the second image according to the local motion magnitude. Therefore, accuracy of the moving target detection can be improved, ghosting is eliminated, and accuracy of the image fusion is relatively high.

Figure 3:
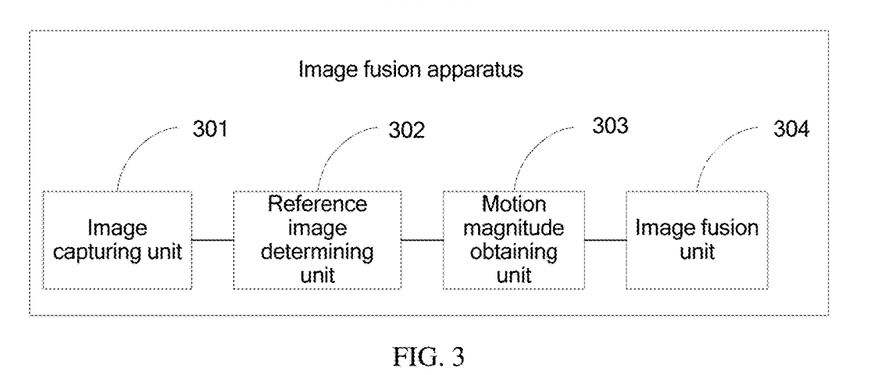
FIG. 3 is a schematic structural diagram of an image fusion apparatus according to an embodiment of the present invention.

FIG. 3 is a schematic structural diagram of an image fusion apparatus according to an embodiment of the present invention. The image fusion apparatus provided in this embodiment of the present invention may be configured to implement some or all procedures in the embodiment of the image fusion method described in the present invention with reference to FIG. 1A and FIG. 1B. As shown in the figures, the image fusion apparatus in this embodiment of the present invention may include at least an image capturing unit 301, a reference image determining unit 302, a motion magnitude obtaining unit 303, and an image fusion unit 304.

The image capturing unit 301 is configured to capture at least two frames of first images at a same exposure time using a first camera, and capture at least two frames of second images at different exposure times using a second camera, where a capturing time of the first images and a capturing time of the second images are the same.

The reference image determining unit 302 is configured to determine a first reference image from the at least two frames of first images.

The motion magnitude obtaining unit 303 is configured to perform moving target detection on an image other than the first reference image in the at least two frames of first images according to the first reference image to obtain a local motion magnitude that is of the image other than the first reference image in the at least two frames of first images and that is relative to the first reference image.

The image fusion unit 304 is configured to perform image fusion on the second images according to the local motion magnitude.

In an optional embodiment, the image fusion unit 304 in this embodiment of the present invention is specifically configured to: when the local motion magnitude is greater than or equal to a first preset threshold, output an image whose exposure time is a first preset time in the at least two frames of second images.

In an optional embodiment, the image fusion unit 304 in this embodiment of the present invention is specifically configured to: when the local motion magnitude is less than a second preset threshold, determine a second reference image from the at least two frames of second images; perform image registration on an image other than the second reference image in the at least two frames of second images according to the second reference image to obtain a registered second image; and perform image fusion on the second reference image and the registered second image using an image fusion algorithm.

In an optional embodiment, the image fusion unit 304 in this embodiment of the present invention is specifically configured to: when the local motion magnitude is greater than or equal to a second preset threshold and is less than a first preset threshold, determine a second reference image from the at least two frames of second images; perform image registration on an image other than the second reference image in the at least two frames of second images according to the second reference image to obtain a registered second image; perform motion compensation on the registered second image according to the second reference image to obtain a motion-compensated second image; and perform image fusion on the second reference image and the motion-compensated second image using the image fusion algorithm.

In an optional embodiment, the motion magnitude obtaining unit 303 in this embodiment of the present invention is specifically configured to: perform moving target detection on an image other than the first reference image in the at least two frames of first images according to the first reference image to generate a motion compensation matrix that is of the image other than the first reference image in the at least two frames of first images and that is relative to the first reference image; perform image registration on the image other than the first reference image in the at least two frames of first images according to the motion compensation matrix that is of the image other than the first reference image in the at least two frames of first images and that is relative to the first reference image to obtain a registered first image; and obtain a local motion magnitude that is of the registered first image and that is relative to the first reference image.

In an optional embodiment, that the motion magnitude obtaining unit 303 performs image registration on an image other than the second reference image in the at least two frames of second images according to the second reference image to obtain a registered second image may be specifically: performing image registration on the image other than the second reference image in the at least two frames of second images according to the motion compensation matrix that is of the image other than the first reference image in the at least two frames of first images and that is relative to the first reference image to obtain the registered second image.

In the image fusion apparatus shown in FIG. 3, the image capturing unit 301 captures the at least two frames of first images at the same exposure time using the first camera, and captures the at least two frames of second images at the different exposure times by using the second camera, where the capturing time of the first images and the capturing time of the second images are the same. The reference image determining unit 302 determines the first reference image from the at least two frames of first images. The motion magnitude obtaining unit 303 performs moving target detection on the image other than the first reference image in the at least two frames of first images according to the first reference image to obtain the local motion magnitude that is of the image other than the first reference image in the at least two frames of first images and that is relative to the first reference image. The image fusion unit 304 performs image fusion on the second image according to the local motion magnitude. Therefore, accuracy of the moving target detection can be improved, ghosting is eliminated, and accuracy of the image fusion is relatively high.

Figure 4:
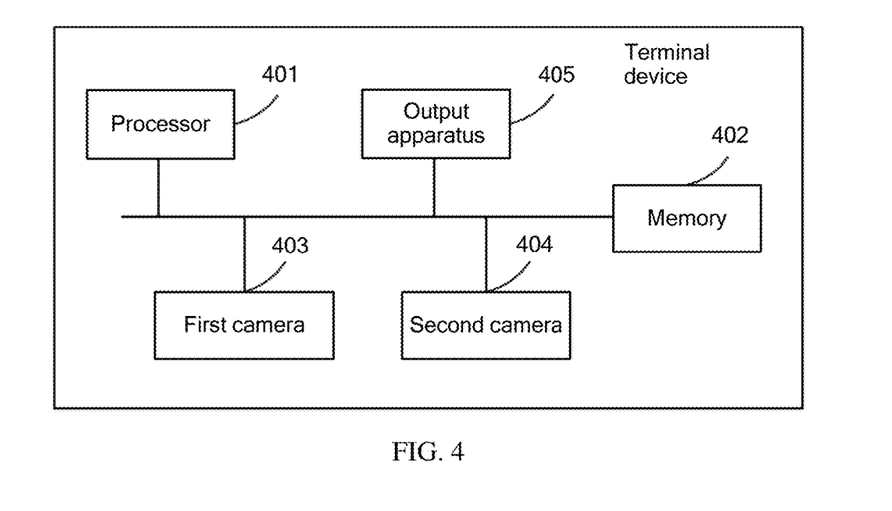
FIG. 4 is a schematic structural diagram of a terminal device according to an embodiment of the present invention.

Referring to FIG. 4, FIG. 4 is a schematic structural diagram of a terminal device according to an embodiment of the present invention. As shown in FIG. 4, the terminal device may include a processor 401, a memory 402, a first camera 403, a second camera 404, and an output apparatus 405. The processor 401 is connected to the memory 402, the first camera 403, the second camera 404, and the output apparatus 405. For example, the processor 401 may be connected to the memory 402, the first camera 403, the second camera 404, and the output apparatus 405 using a bus.

The processor 401 may be a central processing unit (CPU), a network processor (NP), or the like.

The memory 402 may be specifically configured to store a first image, a second image, and the like. The memory 402 may include a volatile memory, for example, a random access memory (RAM); the memory may also include a non-volatile memory, for example, a read-only memory (ROM), a flash memory, a hard disk drive (HDD), or a solid-state drive (SSD); the memory may further include a combination of the foregoing types of memories.

The first camera 403 is configured to capture the first image.

The second camera 404 is configured to capture the second image.

The output apparatus 405 is configured to output an image; for example, the output apparatus 405 may be a display screen.

The processor 401, the first camera 403, and the second camera 404 call a program stored in the memory 402 to perform the following operations: the first camera 403 is configured to capture at least two frames of first images at a same exposure time; the second camera 404 is configured to capture at least two frames of second images at different exposure times, where a capturing time of the first images and a capturing time of the second images are the same; the processor 401 is configured to determine a first reference image from the at least two frames of first images; the processor 401 is further configured to perform moving target detection on an image other than the first reference image in the at least two frames of first images according to the first reference image to obtain a local motion magnitude that is of the image other than the first reference image in the at least two frames of first images and that is relative to the first reference image; and the processor 401 is further configured to perform image fusion on the second images according to the local motion magnitude.

In an optional embodiment, that the processor 401 performs image fusion on the second images according to the local motion magnitude specifically includes: when the local motion magnitude is greater than or equal to a first preset threshold, outputting, by the processor 401, an image whose exposure time is a first preset time in the at least two frames of second images.

In an optional embodiment, that the processor 401 performs image fusion on the second images according to the local motion magnitude specifically includes: when the local motion magnitude is less than a second preset threshold, determining, by the processor 401, a second reference image from the at least two frames of second images; performing, by the processor 401, image registration on an image other than the second reference image in the at least two frames of second images according to the second reference image to obtain a registered second image; and performing, by the processor 401, image fusion on the second reference image and the registered second image using an image fusion algorithm.

In an optional embodiment, that the processor 401 performs image fusion on the second images according to the local motion magnitude specifically includes: when the local motion magnitude is greater than or equal to a second preset threshold and is less than a first preset threshold, determining, by the processor 401, a second reference image from the at least two frames of second images; performing, by the processor 401, image registration on an image other than the second reference image in the at least two frames of second images according to the second reference image to obtain a registered second image; performing, by the processor 401, motion compensation on the registered second image according to the second reference image to obtain a motion-compensated second image; and performing, by the processor 401, image fusion on the second reference image and the motion-compensated second image by using the image fusion algorithm.

In an optional embodiment, that the processor 401 performs moving target detection on an image other than the first reference image in the at least two frames of first images according to the first reference image to obtain a local motion magnitude that is of the image other than the first reference image in the at least two frames of first images and that is relative to the first reference image specifically includes: performing, by the processor 401, moving target detection on the image other than the first reference image in the at least two frames of first images according to the first reference image to generate a motion compensation matrix that is of the image other than the first reference image in the at least two frames of first images and that is relative to the first reference image; performing, by the processor 401, image registration on the image other than the first reference image in the at least two frames of first images according to the motion compensation matrix to obtain a registered first image; and obtaining, by the processor 401, a local motion magnitude that is of the registered first image and that is relative to the first reference image.

In an optional embodiment, that the processor 401 performs image registration on an image other than the second reference image in the at least two frames of second images according to the second reference image to obtain a registered second image specifically includes: performing, by the processor 401, image registration on the image other than the second reference image in the at least two frames of second images according to the motion compensation matrix to obtain the registered second image.

Specifically, the terminal device described in this embodiment of the present invention may be configured to implement some or all procedures in the embodiment of the image fusion method described in the present invention with reference to FIG. 1A and FIG. 1B.

In descriptions in this specification, descriptions about such reference terms as "an embodiment", "some embodiments", "an example", "a specific example", and "some examples" mean that specific features, structures, materials, or characteristics described with reference to the embodiments or examples are included in at least one embodiment or example of the present invention. In the specification, the foregoing examples of expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the feature. In the descriptions about the present invention, "multiple" means at least two, for example, two or three, unless otherwise specifically limited.

Logic and/or steps, for example, program lists of executable instructions regarded as configured to implement logical functions, indicated in flowcharts or described herein in another manner can be specifically implemented in any computer readable medium, so as to be used by an instruction-executing system, apparatus, or device (for example, a computer-based system, a system that includes a processor, or another system that can obtain an instruction from an instruction-executing system, apparatus, or device and execute the instruction), or be used in combination with the instruction-executing system, apparatus, or device. With respect to this specification, the "computer readable medium" may be any apparatus that can include, store, communicate, propagate, or transmit a program, so that the program can be used by the instruction-executing system, apparatus, or device or be used in combination with the instruction-executing system, apparatus, or device. More specific examples (a non-exhaustive list) of the computer readable medium include the following: an electrical connection part (an electronic apparatus) that has one or more laid wires, a portable computer disk box (a magnetic apparatus), a random access memory, a read-only memory, an erasable programmable read only memory, an optical fiber apparatus, and a portable compact disc read-only memory. In addition, the computer readable medium may even be a paper on which the program can be printed or another suitable medium. This is because the program can be obtained in an electronic manner by performing optical scanning on the paper or the another medium and then performing edition and decoding, or by performing processing in another proper manner when necessary, and then the program is stored in a computer memory.

It should be understood that parts of the present invention can be implemented by using hardware, software, firmware, or combinations thereof. In the foregoing implementations, multiple steps or methods can be implemented by using software or firmware that are stored in a memory and are executed by a proper instruction execution system. For example, if hardware is used for implementation, being similar to implementation in another implementation, any item or a combination of the following well-known technologies in the art may be used for implementation: a discrete logic circuit having a logic gate circuit that is used to implement a logic function for a data signal, an application-specific integrated circuit having an appropriate combinatorial logic circuit, a programmable gate array, a field programmable gate array, and the like.

The modules in the embodiments of the present invention may be implemented in a form of hardware, or may be implemented in a form of a software functional module. When the integrated module is implemented in the form of a software functional module and sold or used as an independent product, the integrated unit may be stored in a computer-readable storage medium.

Although the embodiments of the present invention are shown and described above, it can be understood that, the foregoing embodiments are examples, and cannot be construed as a limitation to the present invention. Within the scope of the present invention, a person of ordinary skill in the art may make changes, modifications, replacement, and variations to the foregoing embodiments.

What claimed is:

1. A method, comprising:
capturing, by a terminal device, a plurality of first image frames at a same exposure time using a first camera, wherein a first camera and a second camera are disposed on the terminal device;
capturing, by the terminal device, a plurality of second image frames at different exposure times using the second camera, wherein, for each of the plurality of first image frames, a capturing time of the respective first image frame is the same as a capturing time of a corresponding second image frame of the plurality of second image frames;

determining, by the terminal device, a first reference image frame from the plurality of first image frames;

performing, by the terminal device, moving target detection on another image frame of the plurality of first image frames according to the first reference image frame, to obtain a local motion magnitude of the another image frame of the plurality of first image frames, wherein the another image frame of the plurality of first image frames is a different frame than the first reference image frame, and the local motion magnitude of the another image frame of the plurality of first image frames is relative to the first reference image frame, and wherein the local motion magnitude indicates information about a quantity of pixels occupied by a moving target detected by performing the moving target detection; and performing, by the terminal device, image fusion on the plurality of second image frames according to the local motion magnitude.

2. The method according to claim 1, wherein performing image fusion on the plurality of second image frames according to the local motion magnitude comprises:

when the local motion magnitude is greater than or equal to a first preset threshold, outputting an image frame whose exposure time is a first preset time in the plurality of second image frames.

3. The method according to claim 1, wherein performing image fusion on the plurality of second image frames according to the local motion magnitude comprises:

when the local motion magnitude is less than a second preset threshold, determining a second reference image frame from the plurality of second image frames;

performing image registration on another image frame of the plurality of second image frames according to the second reference image frames, to obtain a registered second image frame, wherein the another image frame of the plurality of second image frames and the second reference image frame are different frames; and performing image fusion on the second reference image frame and the registered second image frame using an image fusion algorithm.

4. The method according to claim 1, wherein performing image fusion on the plurality of second image frames according to the local motion magnitude comprises:

when the local motion magnitude is greater than or equal to a second preset threshold and is less than a first preset threshold, determining a second reference image frame from the plurality of second image frames;

performing image registration on another image frame of the plurality of second image frames according to the second reference image frame, to obtain a registered second image frame, wherein the another image frame of the plurality of second image frames and the second reference image frame are different frames;

performing motion compensation on the registered second image frame according to the second reference image frame, to obtain a motion-compensated second image frame; and performing image fusion on the second reference image frame and the motion-compensated second image frame using an image fusion algorithm.

5. The method according to claim 1, wherein performing moving target detection on another image frame of the plurality of first image frames according to the first reference image frame, to obtain a local motion magnitude of the another image frame of the plurality of first image frames, comprises:

performing moving target detection on the another image frame of the plurality of first image frames according to the first reference image frame, to generate a motion compensation matrix of the another image frame of the plurality of first image frames, wherein the motion compensation matrix is relative to the first reference image frame;

performing image registration on the another image frame of the plurality of first image frames according to the motion compensation matrix, to obtain a registered first image frame; and obtaining a local motion magnitude of the registered first image frame that is relative to the first reference image frame.

6. The method according to claim 5, wherein performing image fusion on the plurality of second image frames according to the local motion magnitude comprises:

performing image registration on an image frame of the plurality of second image frames according to the motion compensation matrix, to obtain a registered second image frame, wherein the another image frame of the plurality of second image frames and a second reference image frame are different frames.

7. An apparatus, comprising:

an image capturing unit, configured to:
capture, using a first camera, a plurality of first image frames at a same exposure time; and
capture, using a second camera, a plurality of second image frames at different exposure times, wherein, for each of the plurality of first image frames, a capturing time of the respective first image frame is the same as a capturing time of a corresponding second image frame of the plurality of second image frames;

a reference image determining unit, configured to determine a first reference image frame from the plurality of first image frames;

a motion magnitude obtaining unit, configured to:
perform moving target detection on another image frame of the plurality of first image frames according to the first reference image frame, to obtain a local motion magnitude of the another image frame of the plurality of first image frames, wherein the another image frame of the plurality of first image frames is a different frame than the first reference image frame, and the local motion magnitude is relative to the first reference image frame, and wherein the local motion magnitude indicates information about a quantity of pixels occupied by a moving target detected by performing the moving target detection; and an image fusion unit, configured to perform image fusion on the plurality of second image frames according to the local motion magnitude.

8. The apparatus according to claim 7, wherein the image fusion unit is configured to:

when the local motion magnitude is greater than or equal to a first preset threshold, output an image frame whose exposure time is a first preset time in the plurality of second image frames.

9. The apparatus according to claim 7, wherein the image fusion unit is configured to:

when the local motion magnitude is less than a second preset threshold, determine a second reference image frame from the plurality of second image frames;

perform image registration on another image frame of the plurality of second image frames according to the second reference image frame, to obtain a registered second image frame, wherein the another image frame of the plurality of second image frames is a different frame than the second reference image frame; and perform image fusion on the second reference image frame and the registered second image frame using an image fusion algorithm.

10. The apparatus according to claim 7, wherein the image fusion unit is configured to:

when the local motion magnitude is greater than or equal to a second preset threshold and is less than a first preset threshold, determine a second reference image frame from the plurality of second image frames;

perform image registration on another image of the plurality of second image frames according to the second reference image frame, to obtain a registered second image frame, wherein the another image frame of the plurality of second image frames is a different frame than the second reference image frame;

perform motion compensation on the registered second image frame according to the second reference image frame, to obtain a motion-compensated second image frame; and perform image fusion on the second reference image frame and the motion-compensated second image frame using an image fusion algorithm.

11. The apparatus according to claim 7, wherein the motion magnitude obtaining unit is configured to:

perform moving target detection on the another image frame of the plurality of first image frames according to the first reference image frame, to generate a motion compensation matrix of the another image frame of the plurality of first image frames, wherein the motion compensation matrix is relative to the first reference image frame;

perform global image registration on the another image frame of the plurality of first image frames according to the motion compensation matrix, to obtain a registered first image frame; and obtain a local motion magnitude of the registered first image frame that is relative to the first reference image frame.

12. The apparatus according to claim 11, wherein the image fusion unit being configured to perform image fusion on the plurality of second image frames according to the local motion magnitude comprises the image fusion unit being configured to:

perform image registration on another image frame of the plurality of second image frames according to the motion compensation matrix, to obtain a registered second image frame, wherein the another image frame of the plurality of second image frames and a second reference image frame are different frames.

13. A terminal device, comprising:
a processor;
a non-transitory memory;
a first camera; and
a second camera;
wherein the memory stores a set of program code, and the processor is configured to execute the program code stored in the memory to:
capture, using the first camera, a plurality of first image frames at a same exposure time;
capture, using the second camera, a plurality of second image frames at different exposure times, wherein, for each of the plurality of first image frames, a capturing time of the respective first image frame is the same as a capturing time of a corresponding second image frame of the plurality of second image frames;
determine a first reference image frame from the plurality of first image frames;
perform moving target detection on another image frame of the plurality of first image frames according to the first reference image frame, to obtain a local motion magnitude of the another image frame of the plurality of first image frames, wherein the another image frame of the plurality of first image frames is a different frame than the first reference image frame, and the local motion magnitude is relative to the first reference image frame, and wherein the local motion magnitude indicates information about a quantity of pixels occupied by a moving target detected by performing the moving target detection; and
performing image fusion on the plurality of second image frames according to the local motion magnitude.

14. The terminal device according to claim 13, wherein the processor being configured to execute the program code stored in the memory to perform image fusion on the plurality of second image frames according to the local motion magnitude comprises the processor being configured to execute the program code stored in the memory to:
when the local motion magnitude is greater than or equal to a first preset threshold, output an image frame whose exposure time is a first preset time in the plurality of second image frames.

15. The terminal device according to claim 13, wherein the processor being configured to execute the program code stored in the memory to perform image fusion on the plurality of second image frames according to the local motion magnitude comprises the processor being configured to execute the program code stored in the memory to:
when the local motion magnitude is less than a second preset threshold, determine a second reference image frame from the plurality of second image frames;
performing, by the processor, image registration on another image frame of the plurality of second image frames according to the second reference image frame, to obtain a registered second image frame, wherein the another image frame of the plurality of second image frames and the second reference image frame are different frames; and
performing image fusion on the second reference image frame and the registered second image frame using an image fusion algorithm.

16. The terminal device according to claim 13, wherein the processor being configured to execute the program code stored in the memory to perform image fusion on the plurality of second image frames according to the local motion magnitude comprises the processor being configured to execute the program code stored in the memory to:
when the local motion magnitude is greater than or equal to a second preset threshold and is less than a first preset threshold, determine a second reference image frame from the plurality of second image frames;
perform image registration on another image of the plurality of second image frames according to the second reference image frame, to obtain a registered second image frame, wherein the another image of the plurality of second image frames and the second reference image frame are different frames;

perform motion compensation on the registered second image frame according to the second reference image frame, to obtain a motion-compensated second image frame; and perform image fusion on the second reference image frame and the motion-compensated second image frame using an image fusion algorithm.

17. The terminal device according to claim 13, wherein the processor being configured to execute the program code stored in the memory to perform moving target detection on the another image frame of the plurality of first image frames according to the first reference image frame, to obtain the local motion magnitude of the another image frame of the plurality of first image frames, comprises the processor being configured to execute the program code stored in the memory to:

perform moving target detection on the another image frame of the plurality of first image frames according to the first reference image frame, to generate a motion compensation matrix of the another image frame of the plurality of first image frames, wherein the motion compensation matrix is relative to the first reference image frame;

perform image registration on the another image frame of the plurality of first image frames according to the motion compensation matrix, to obtain a registered first image frame; and obtain a local motion magnitude of the registered first image frame that is relative to the first reference image frame.

18. The terminal device according to claim 17, wherein the processor being configured to execute the program code stored in the memory to perform image fusion on the plurality of second image frames according to the local motion magnitude comprises the processor being configured to execute the program code stored in the memory to:

perform image registration on another image frame of the plurality of second image frames according to the motion compensation matrix, to obtain a registered second image frame, wherein the another image frame of the plurality of second image frames and a second reference image frame are different frames.

* * * * *